(12) United States Patent
Pansegrouw

(10) Patent No.: US 10,562,437 B2
(45) Date of Patent: Feb. 18, 2020

(54) DUNNAGE BAG ARRANGEMENT

(71) Applicant: Stopak India Pvt. Ltd., Bangalore (IN)

(72) Inventor: Bester Jacobus Pansegrouw, Ottery (ZA)

(73) Assignee: Stopak India Pvt. Ltd., Bangalore (IN)

( * ) Notice: Subject to any disclaimer, the term of this patent is extended or adjusted under 35 U.S.C. 154(b) by 63 days.

(21) Appl. No.: 15/897,717

(22) Filed: Feb. 15, 2018

(65) Prior Publication Data

US 2018/0170649 A1    Jun. 21, 2018

Related U.S. Application Data

(63) Continuation of application No. 14/898,822, filed as application No. PCT/IB2014/062197 on Jun. 13, 2014, now Pat. No. 9,896,256.

(51) Int. Cl.
| | |
|---|---|
| *B60P 7/08* | (2006.01) |
| *B60P 7/06* | (2006.01) |
| *B61D 45/00* | (2006.01) |
| *B60P 7/135* | (2006.01) |
| *B60P 7/18* | (2006.01) |
| *B63B 25/24* | (2006.01) |
| *B65D 81/05* | (2006.01) |

(Continued)

(52) U.S. Cl.
CPC .............. *B60P 7/065* (2013.01); *B60P 7/135* (2013.01); *B60P 7/14* (2013.01); *B60P 7/16* (2013.01); *B60P 7/18* (2013.01); *B61D 45/00* (2013.01); *B61D 45/001* (2013.01); *B61D 45/002* (2013.01); *B61D 45/008* (2013.01); *B63B 25/24* (2013.01); *B65D 81/05* (2013.01); *B65D 81/051* (2013.01); *B65D 81/107* (2013.01); *B65D 81/113* (2013.01)

(58) Field of Classification Search
CPC .... B60P 7/065; B60P 7/18; B60P 7/14; B60P 7/16; B60P 7/135; B65D 81/113; B65D 81/107; B65D 81/051; B65D 81/05; B65D 81/052; B63B 25/24; B61D 45/002; B61D 45/001; B61D 45/008; B61D 45/00
USPC .... 410/117–119, 125, 128, 154, 155; 383/3, 383/25, 109, 113; 206/522, 593; 428/35.2
See application file for complete search history.

(56) References Cited

U.S. PATENT DOCUMENTS

| | | | |
|---|---|---|---|
| 2,990,070 | A | 6/1961 | Cushman |
| 3,028,981 | A | 4/1962 | Ford et al. |

(Continued)

FOREIGN PATENT DOCUMENTS

| | | |
|---|---|---|
| CA | 2 254 253 | 6/2004 |
| EP | 0 924 140 | 6/1999 |

(Continued)

*Primary Examiner* — Stephen T Gordon
(74) *Attorney, Agent, or Firm* — Neal, Gerber & Eisenberg LLP

(57) ABSTRACT

The invention discloses a dunnage bag arrangement for securing loads, includes an inflatable dunnage bag having a gastight inflatable bladder; and a hanger member connected to the dunnage bag and adapted to being supported on top of loads and adapted to support the dunnage bag in a void between loads. The dunnage bag includes a reinforcing sleeve made of at least one material ply, the sleeve having a first opening and a second opening, and the sleeve being folded and sealed and/or stitched to close off at least one of the openings.

9 Claims, 2 Drawing Sheets

(51) Int. Cl.
*B60P 7/16* (2006.01)
*B60P 7/14* (2006.01)
*B65D 81/107* (2006.01)
*B65D 81/113* (2006.01)

(56) References Cited

U.S. PATENT DOCUMENTS

| | | |
|---|---|---|
| 3,072,270 A | 1/1963 | Tolby et al. |
| 3,131,648 A | 5/1964 | Seger |
| 3,145,853 A | 8/1964 | Langenberg |
| 3,199,689 A | 8/1965 | Feldkamp |
| 3,442,402 A | 5/1969 | Baxter |
| 3,554,135 A | 1/1971 | Duvall et al. |
| 3,643,268 A | 2/1972 | Stamberger |
| 3,667,625 A | 6/1972 | Lucas |
| 3,868,026 A | 2/1975 | Baxter |
| 3,939,995 A | 2/1976 | Baxter |
| 4,102,364 A | 7/1978 | Leslie et al. |
| 4,116,344 A | 9/1978 | Ziemba |
| 4,136,788 A | 1/1979 | Robbins |
| 5,139,842 A | 8/1992 | Sewell |
| 5,730,564 A * | 3/1998 | Howlett, Jr. ............ B60P 7/065 410/119 |
| 5,868,534 A | 2/1999 | Goshorn et al. |
| 5,908,275 A | 6/1999 | Howlett et al. |
| 6,095,732 A | 8/2000 | Howlett, Jr. et al. |
| 6,149,362 A | 11/2000 | Berrier et al. |
| 6,186,714 B1 | 2/2001 | Berrier et al. |
| 6,220,800 B1 | 4/2001 | Elze et al. |
| 6,527,488 B2 | 3/2003 | Elze et al. |
| D499,673 S | 12/2004 | Elze et al. |
| 7,011,480 B2 | 3/2006 | Ahlert et al. |
| 7,128,510 B2 | 10/2006 | Ahlert et al. |
| 7,137,765 B1 | 11/2006 | Elze et al. |
| 7,909,554 B2 | 3/2011 | Keenan et al. |
| 9,545,872 B1 | 1/2017 | Wilson et al. |
| 9,896,256 B2 * | 2/2018 | Pansegrouw ........... B60P 7/065 |
| 2002/0136614 A1 | 9/2002 | Elze et al. |
| 2004/0141824 A1 | 7/2004 | Ahlert et al. |
| 2004/0181156 A1 | 9/2004 | Kingsford et al. |
| 2006/0239791 A1 | 10/2006 | Morris |
| 2009/0116927 A1 | 5/2009 | Keenan et al. |

FOREIGN PATENT DOCUMENTS

| | | |
|---|---|---|
| EP | 0 978 461 | 2/2000 |
| WO | WO 03/078251 | 9/2003 |

* cited by examiner

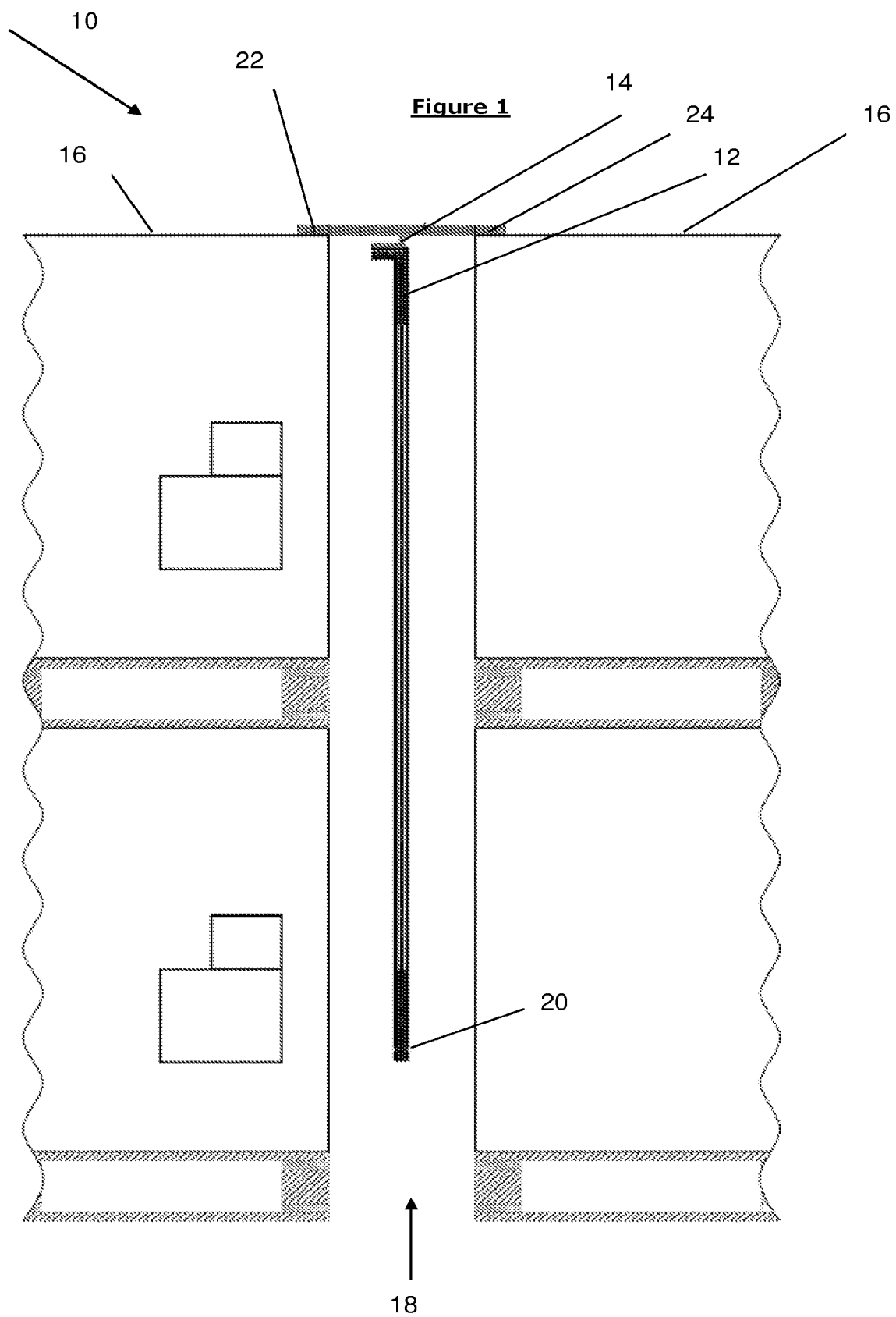

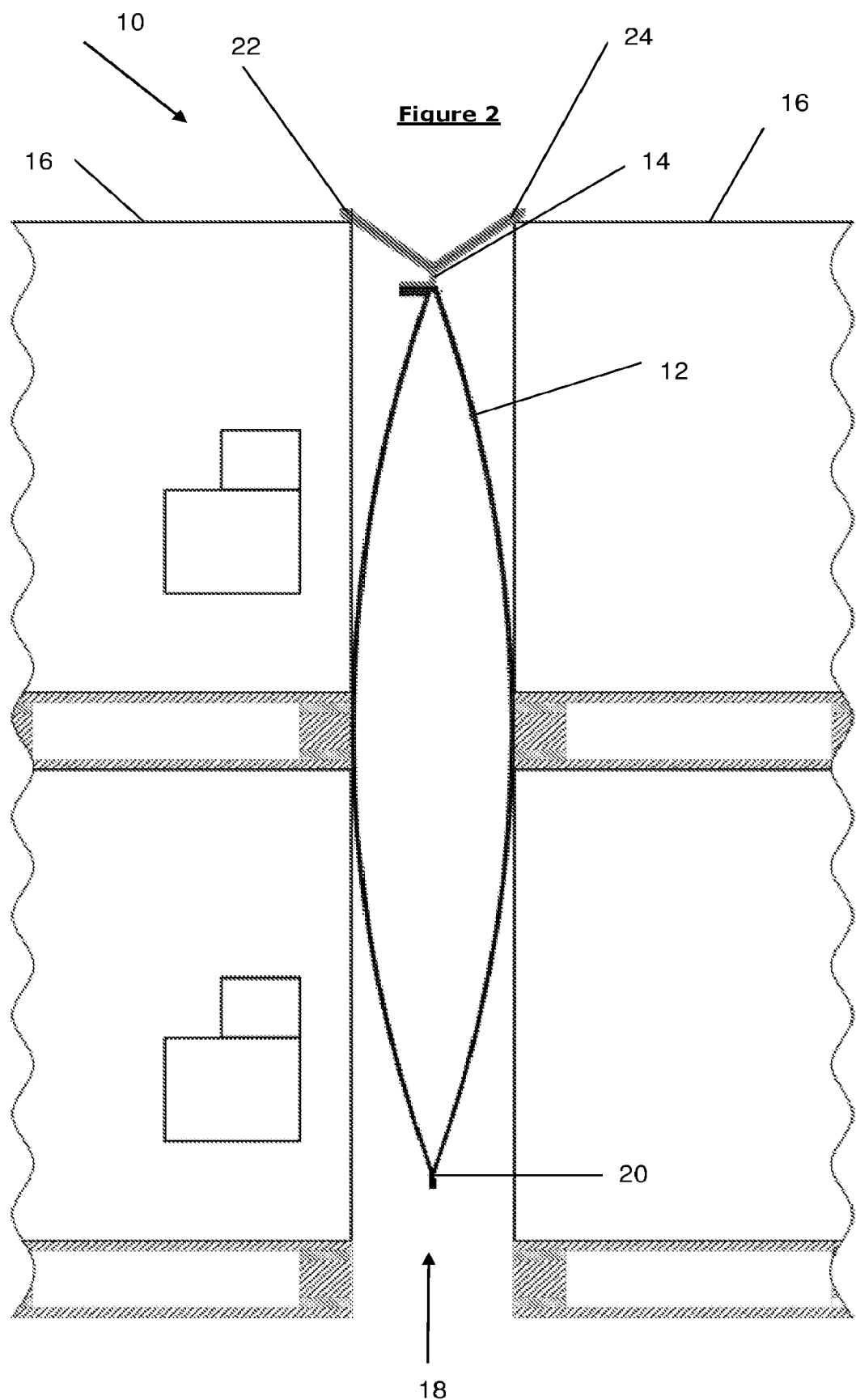

DUNNAGE BAG ARRANGEMENT

PRIORITY CLAIM

This application is a continuation of, claims priority to and the benefit of U.S. patent application Ser. No. 14/898,822, filed on Dec. 16, 2015 as a 371(c) Application of PCT/IB2014/062197, filed on Jun. 13, 2014, which claims priority to and the benefit of South Africa Patent Application No. 2013/04659, filed on Jun. 21, 2013, the entire contents of each are incorporated by reference herein.

FIELD OF INVENTION

The present invention relates to a dunnage bag arrangement. More particularly, the present invention relates to an inflatable dunnage bag arrangement.

BACKGROUND TO INVENTION

Conventional inflatable and disposable dunnage bags include a gastight bladder, usually constructed from polyethylene material, surrounded by an outer protective and supportive casing consisting of at least one ply of paper material. These dunnage bags are used to fill spaces between cargo or between the cargo and the walls of the freight carries in order to prevent the cargo from shifting and damaging either the cargo itself and/or the walls of the freight carrier. The dunnage bags are typically placed between the cargo in a deflated condition and are subsequently inflated with a gas. The pressure of the gas in the dunnage bags is determined by the application, the size and wall composition of the dunnage bags.

The problem with known dunnage bags is that when in the deflated position they slump together and are not correctly positioned or thrown in the void where they need to be inflated with the result that the inflated dunnage bag does not perform its function adequately. Hence currently when a dunnage bag is used, especially a long bag, it tends to flop around until it starts to be inflated. The disadvantages are that it is frustrating for the operator, is time consuming, sometimes the bag has to be deflated to reposition correct and, sometimes it take two operators to position a bag It is an object of the invention to suggest a dunnage bag arrangement which will assist in overcoming these problems.

SUMMARY OF INVENTION

According to the invention, a dunnage bag arrangement for securing loads, includes
(a) an inflatable dunnage bag having a gastight inflatable bladder; and
(b) a hanger member connected to the dunnage bag and adapted to being supported on top of loads and adapted to support the dunnage bag in a void between loads.

Also according to the invention, a method of securing load, includes the steps
(a) of providing in a void between loads to be secured, an inflatable dunnage bag having a gastight inflatable bladder;
(b) of supporting the inflatable dunnage bag in the void between the loads by means of a hanger member connected to the dunnage bag, the hanger member being adapted to being supported on top of the load; and
(c) of inflating the inflatable dunnage bag to secure the loads.

The dunnage bag may include a reinforcing sleeve made of at least one material ply, the sleeve having a first opening, and a second opening, and the sleeve being folded and sealed and/or stitched to close off at least one of the openings.

The size of the hanger member may be adjustable.

The size of the hanger member may depend on the size of the load application and/or the size of the void.

The hanger member may include at least two wing members.

The hanger member and/or the wing members may consist of a rigid material and/or may consist of a plastics material or metal.

The hanger member may be removably connected to the dunnage bag.

The hanger member may be re-usable.

The hanger member may be a hanger type extension to the dunnage bag so that it operates like wings and that these wings then rest on top of the load.

The sleeve may be made of at least one material ply selected from the material group consisting of paper, plastics material, woven PP (polypropylene), HDPE (high-density polyethylene) and PVC (polyvinylchloride).

The sleeve ends may consist of flaps formed by cutting the sleeve at the opening being closed.

The flaps at one end may be folded towards each other to close off the respective opening and/or at one end may be glued to each other to permanently close off the respective opening.

The dunnage bag may be provided with one to six plies of paper sleeves.

The inflatable bladder may be made of polyethylene.

The inflatable bladder may be provided with an inflation valve.

The inflation valve may protrude to the exterior at one of the openings.

The dunnage bag may be adapted to be used in voids larger than 12 inches and/or the void may be smaller than 40 inches.

The dunnage bag may be substantially rectangular in shape.

The dunnage bag may be disposable.

The dunnage bag may be applicable in conjunction with void fillers and/or be applicable in conjunction with friction panels.

At least 50% of the exterior surface area of the dunnage bag may be adapted to be in contact with a load to be secured.

The contact may be direct and/or indirect.

BRIEF DESCRIPTION OF DRAWINGS

The invention will now be described by way of example with reference to the accompanying schematic drawings. In the drawings there is shown in:

FIG. 1: a sectional side view of the dunnage bag arrangement according to the invention in position hanging between four pallets before being inflated; and FIG. 2: a sectional side of the dunnage bag arrangement shown in FIG. 1 after being inflated.

DETAILED DESCRIPTION OF DRAWINGS

Referring, to the drawings, there is shown a dunnage bag arrangement in accordance with the invention. The dunnage bag arrangement 10 for securing loads, includes an inflatable dunnage bag 12 having a gastight inflatable bladder; and a hanger member 14 connected to the dunnage bag 12 and adapted to being supported on top of loads 16 and adapted to support the dunnage bag 12 in a void 18 between loads 16. The dunnage bag 12 includes a reinforcing sleeve made of at least one material ply, the sleeve having a first opening and a second opening, and the sleeve being folded and sealed and/or stitched to close off at least one of the openings 20. The size of the hanger member 14 can be adjustable. The size of the hanger member 14 depends on the size of the load application and the size of the void 18.

The hanger member 14 includes two wing members 22 and 24. The hanger member 14 and the wing members 22 and 24 consist of a rigid material. The hanger member 14 and the wing members 22 and 24 consist of a plastics material or metal. The hanger member 14 is removably connected to the dunnage bag 12 and is thus re-usable. The hanger member 14 is a hanger type extension to the dunnage bag 12 so that it operates like wings and that these wings then rest on top of the load 16. The sleeve is made of at least one material ply selected from the material group consisting of paper, plastics material, woven PP (polypropylene) HDPE (high-density polyethylene) and PVC (polyvinylchloride). The sleeve ends consist of flaps formed by cutting the sleeve at the opening being closed. The flaps at one end are folded towards each other to close off the respective opening. The flaps at one end are glued to each other to permanently close off the respective opening.

The dunnage bag arrangement 10 can be provided with one to six plies of paper sleeves. The inflatable bladder is made of polyethylene. The inflatable bladder is provided with an inflation valve. The inflation valve protrudes to the exterior at one of the openings. The dunnage bag arrangement 10 can be used in voids larger than 12 inches. The void can also be smaller than 40 inches. The dunnage bag arrangement 10 can be substantially rectangular in shape. The dunnage bag arrangement 10 can be disposable. The dunnage bag arrangement 10 is applicable in conjunction with void fillers. The dunnage bag arrangement 10 is applicable in conjunction with friction panels. At least 50% of the exterior surface area of the dunnage bag 12 can be adapted to be in contact with a load to be secured. The contact can be direct or indirect.

Hence the dunnage bag arrangement 10 according to the invention, provides a method of securing load, which includes the steps of providing in a void 18 between loads 16 to be secured, an inflatable dunnage bag 12 having a gastight inflatable bladder; of supporting the inflatable dunnage bag 12 in the void 18 between the loads 16 by means of a hanger member 14 connected to the dunnage bag 12, the hanger member 14 being adapted to being supported on top of the load 16; and of inflating the inflatable dunnage bag 12 to secure the loads 16. This ensures the following correct positioning of the bag 12 therefore less chances of damage; is less time consuming; and requires only one operator.

What I claim is:

1. A dunnage bag arrangement for securing a first load and a second load, the dunnage bag arrangement comprising:
    a dunnage bag comprising an inflatable bladder; and
    first and second wing members connected to the dunnage bag,
    wherein the first and second wing members include respective first portions configured to contact respective upper surfaces of the first and second loads to suspend the dunnage bag at least partially within a void between the first and second loads,
    wherein the first and second wing members are sized to collectively, but not individually, extend across the void when suspending the dunnage bag, and
    wherein the first and second wing members are not parallel to one another when suspending the dunnage bag such that a second portion of the first wing member is positioned within the void and below the upper surface of the first load and such that a second portion of the second wing member is positioned within the void and below the upper surface of the second load.

2. The dunnage bag arrangement of claim 1, wherein the dunnage bag has a top end, a bottom end opposite the top end, a first side extending between the top end and the bottom end, and a second side opposite the first side and extending between the top end and the bottom end, wherein the first and second wing members are connected to the top end of the dunnage bag.

3. The dunnage bag arrangement of claim 1, wherein the dunnage bag further comprises a sleeve that contains the inflatable bladder.

4. The dunnage bag arrangement of claim 3, wherein the sleeve is formed from a paper or a plastic material.

5. The dunnage bag arrangement of claim 4, wherein the sleeve is formed from a woven plastic material.

6. The dunnage bag arrangement of claim 1, wherein the first and second wing members are each formed from a rigid material.

7. The dunnage bag arrangement of claim 6, wherein the first and second wing members are straight.

8. The dunnage bag arrangement of claim 1, wherein the first and second wing members are removably connected to the dunnage bag.

9. The dunnage bag arrangement of claim 1, wherein the dunnage bag further comprises a valve in fluid communication with the inflatable bladder to enable inflation of the inflatable bladder.

* * * * *